United States Patent

[11] 3,624,577

| [72] | Inventors | John T. Barrow, Jr.<br>Rolla, Mo.;<br>Robert D. Morris, Sharon, Pa. |
|---|---|---|
| [21] | Appl. No. | 867,319 |
| [22] | Filed | Oct. 17, 1969 |
| [45] | Patented | Nov. 30, 1971 |
| [73] | Assignee | Westinghouse Electric Corporation<br>Pittsburgh, Pa. |

[54] TAPPED MULTILAYER WINDING FOR ELECTRICAL INDUCTIVE APPARATUS
7 Claims, 5 Drawing Figs.

[52] U.S. Cl. .................................................. 336/150,
336/180, 336/192
[51] Int. Cl. ........................................ H01f 21/12,
H01f 15/10, H01f 27/28
[50] Field of Search ........................................ 336/69, 70,
145, 147, 148, 150, 180, 181, 182, 183, 186, 192

[56] References Cited
UNITED STATES PATENTS

| 2,757,347 | 7/1956 | Pozaryski | 336/192 X |
| 3,337,828 | 8/1967 | Vargo | 336/192 X |
| 3,185,946 | 5/1965 | Johnson | 336/150 X |

FOREIGN PATENTS

| 1,099,491 | 1/1968 | Great Britain | 336/69 |

Primary Examiner—Laramie E. Askin
Attorneys—A. T. Stratton, F. E. Browder and D. R. Lackey ABSTRACT: A tapped winding for electrical inductive apparatus having at least first, second, third and fourth concentrically adjacent layers of conductor turns. Each layer of conductor turns is formed of first and second axially interleaved conductors, the ends of which extend outwardly from the axial ends of the winding structure. Predetermined adjacent ends of the first and second conductors are interconnected between predetermined adjacent layers, at each axial end of the winding structure, to provide a single series circuit through the winding which sequentially traverses the first, second, first, second, third, fourth, third and fourth layers, with the interconnected ends being adapted for connection to external tap leads.

TAPPED MULTILAYER WINDING FOR ELECTRICAL INDUCTIVE APPARATUS

BACKGROUND OF THE INVENTION

1. Field of the Invention:

The invention relates in general to electrical inductive apparatus, such as power transformers, and more specifically to tapped windings for electrical inductive apparatus.

2. Description of the Prior Art:

It is common in the prior art to construct tapped windings for electrical inductive apparatus with the taps at one or both of the axial ends of the winding, in order to change taps without changing the electrical center line of the winding, i.e., the center line perpendicular to the longitudinal axis of the winding, which equally divides the ampere turns of the winding. Examples of this type of winding are shown in U.S. Pat. Nos. 3,185,946, 2,757,347, and 3,337,828, with the latter two patents being assigned to the same assignee as the present application. These patents describe tapped winding structures which are especially suitable for regulating up to about 10 percent of the total voltage of an associated winding, but mechanical and/or electrical difficulties may be experienced when the regulation is required to be extended to 30 or 40 percent, as is common in arc furnace and rectifier transformers. Increasing the current requirements further complicates the problem, as the conductors become larger in cross section which creates a very difficult problem in bringing the leads out of the winding structure adjacent the pressure plate. Increasing the sections or taps on the tap changing apparatus, also aggravates the mechanical problem as more sections are required in the winding, each with an external terminal which is connected to a tap lead. In the prior art structures, increasing the conductor size and number of tap sections increases the circumferential space required at the end or ends of the winding for bringing out the leads, which complicates the insulating of the leads and makes it more difficult to get the leads out past the pressure plate.

Therefore, it would be desirable to be able to construct a 20 regulating or tapped winding structure for electrical inductive apparatus which may be used with equal facility with conventional regulating transformers, as well as with high current, extended regulating range transformers having tap changers with a large plurality of sections. Further, the new and improved regulating or tapped winding structure should have a high mechanical strength, with a height and radial build dimension selected to balance the horizontal and vertical forces produced in the winding. Still further, the maximum voltage between turns of a layer of conductors, and between the turns of adjacent layers of conductors, must be limited to practical values in order to facilitate the insulating of the winding structure.

SUMMARY OF THE INVENTION

Briefly, the present invention is a new and improved tapped multilayer winding structure for electrical inductive apparatus, which utilizes a winding layer for each two tap sections of the associated tap changer. Thus, with an eight section tap changer, four concentrically adjacent layers are utilized. Each layer has a plurality of conductor turns formed of first and second axially interleaved conductors, the ends of which extend outwardly from opposite axial ends of the winding. The conductors of all the layers are connected in series circuit relation, by winding adjacent layers in opposite circumferential directions, and connecting predetermined adjacent ends of conductors from predetermined adjacent layers, at both ends of the winding, such that the series circuit proceeds through the first two layers via one of their conductors, and then returns to proceed through the first two layers via their remaining conductors. The circuit then proceeds to the third layer where this pattern is repeated in the third and fourth layers. This construction forms a lead group which is narrow circumferentially, enabling the first and second conductors to be formed of a relatively wide conductive material, which increases the mechanical strength of the winding while still enabling the conductors to be easily brought past the pressure plate at each axial end of each phase winding assembly of the inductive apparatus. The uniform number of conductors per layer, and turns per layer, enables each layer to be constructed without insulating filler strips, thus preserving the high mechanical strength of the winding assembly.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

Figure 1:
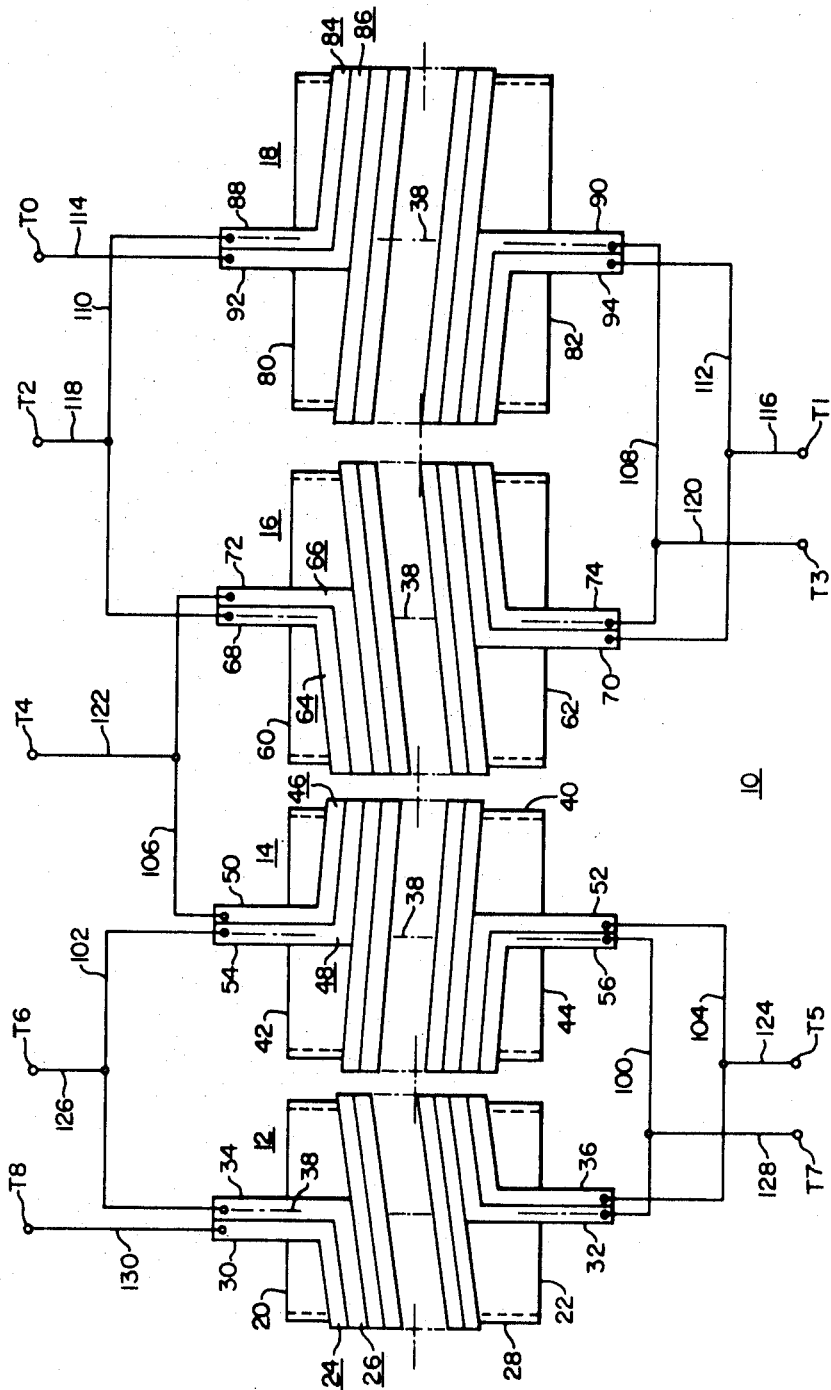
FIG. 1 is an elevational view of the various layers of a winding constructed according to the teachings of the invention, which is suitable for use with an eight section tap changer, with the interconnection of the layers being shown schematically.

Referring now to the drawings, and FIG. 1 in particular, there is shown a tapped winding structure 10 constructed according to the teachings of the invention, which is suitable for use with an eight section tap changer. According to the teachings of the invention, the tapped winding 10 requires one half as many winding layers as there are tap sections in the associated tap changer, or four in this instance, which are referenced 12, 14, 16 and 18. The four layers are shown disassembled and interconnected schematically, in order to more clearly illustrate each individual layer. In practice, the four layers 12, 14, 16 and 18 are disposed in concentric adjacent relation, and they are dimensioned accordingly.

Each layer is wound with first and second conductors, each having one or more electrically conductive strands. Thus, the innermost layer 12, which in this example may be called either the first or fourth layer, as desired, has first and second axially opposite ends 20 and 22, respectively, and a plurality of conductor turns wound from first and second conductors 24 and 26, respectively. As used in this specification, the first conductor starts the turn nearest the first axial end of the layer. The first and second conductors 24 and 26 are wound side-by-side in a predetermined circumferential direction about an insulating tube 28, disposed on a suitable winding mandrel, thus axially interleaving the turns of the two conductors. Each conductor has first and second ends which are bent to extend outwardly from the first and second ends 20 and 22 of the layer assembly 12, with the first conductor 24 having first and second ends 30 and 32, respectively, and with the second conductor 26 having first and second ends 34 and 36, respectively. In this example, the ends 30 and 34 of the first and second conductors 24 and 26, respectively, extend axially inwardly and start the conductor turns by proceeding to the left, as illustrated in FIG. 1 when facing the drawing. The axially extending ends of conductors 24 and 26, at each axial end of the layer assembly 12, should be positioned circumferentially such that a vertical center line 38 will intersect the longitudinal centerline of end 34 of the second conductor 26 at the first end 20 of the layer assembly, and the longitudinal centerline of end 32 of the first conductor 24 at the second end of the layer assembly 12. The purpose of this relative circumferential placement of the axially extending ends of the conductors will be hereinafter explained. The conductors are insulated for the electrical stresses they will be called upon to withstand, and then are wound tightly together without filler material, to preserve the high mechanical strength of the winding structure.

The next to the innermost layer 14, which may be wound on a winding tube 40 having an inner diameter sized to enable the assembly to be telescoped over layer 12, or which may be wound directly on the first layer, utilizing suitable layer insulation, or duct spacers if a cooling duct is required, has first and second axially opposite ends 42 and 44, respectively, and a plurality of conductor turns wound from first and second conductors 46 and 48, respectively. Each conductor has first and second ends which are bent to extend outwardly from the first and second ends 42 and 44 of the layer assembly 14, with the first conductor 46 having first and second ends 50 and 52, and with the second conductor 48 having first and second ends 54 and 56, respectively. Since the innermost layer 12 started the conductor turns by winding the conductors to the left, when viewing the figures, the conductor turns of layer assembly 14 are started in the opposite direction, by winding the conductors to the right when viewing the FIG. The ends of the conductors 46 and 48, at each axial end of the layer assembly 14, should be positioned circumferentially such that a vertical centerline 38 will intersect the longitudinal center line of end 54 of the second conductor 48 at the first end 42 of the layer assembly, and the longitudinal centerline of end 56 of the second conductor 48, at the second end 44 of the layer assembly 14.

The next layer, progressing outwardly from the innermost layer, is layer 16, which may be wound on a suitable winding tube, or directly upon the layer 14, utilizing suitable layer insulation, or spacers for cooling ducts, as required. Winding layer 16 has first and second axially opposite ends 60 and 62, respectively, and a plurality of conductor turns wound from first and second conductors 64 and 66, respectively. Each conductor has first and second ends which are bent to extend axially outwardly from the first and second ends 60 and 62 of the layer assembly 16, with the first conductor 64 having first and second ends 68 and 70, respectively, and with the second conductor 66 having first and second ends 72 and 74, respectively. In this layer, the turns are wound in a direction which is opposite to the circumferential direction of winding layer 14. Thus, when viewing the FIG. the turns are wound circumferentially to the left, which is the same circumferential direction as the first or innermost winding layer 12. The ends of the conductors 64 and 66, at each axial end of the layer assembly 16, should be positioned circumferentially such that a vertical centerline 38 will intersect the longitudinal centerline of end 68 of the first conductor 64 at the first end 60 of the winding layer 16, and the longitudinal centerline of end 74 of the second conductor 66 at the second end 62 of the winding layer 16.

The outermost layer 18, which may be wound on a suitable winding tube, or directly upon layer 16, while utilizing suitable layer insulation or duct spacers, as desired, has first and second axially opposite ends 80 and 82, respectively, and a plurality of conductor turns wound from first and second conductors 84 and 86 respectively. Each conductor has first and second ends which are bent to extend outwardly from the first and second ends 80 and 82 of the layer assembly 18, with the first conductor 84 having first and second ends 88 and 90, respectively, and with the second conductor 86 having first and second ends 92 and 94, respectively. The turns of layer 18 are wound in a circumferential direction which is opposite to the direction of the turns of layer 16, starting to the right when viewing the FIG. The ends of the conductors 84 and 86, at each axial end of the layer assembly 18, should be positioned circumferentially such that a vertical centerline 38 will intersect the longitudinal centerline of end 88 of the first conductor 84 at the first end 80 of the layer assembly 18, and the longitudinal centerline of end 90 of the first conductor 84 at the second end 82 of the layer assembly 18.

The first and second conductors of the layers are interconnected to provide a single series circuit which extends between one of the ends of one of the conductors in the innermost layer, and one of the ends of one of the conductors in the outermost layer. Top-to-bottom interconnections are eliminated by connecting the conductors such that the circuit "steps" back and forth between adjacent coils, enabling physically adjacent ends of conductors in adjacent layers to be interconnected to provide the desired series circuit. In other words, the circuit proceeds through a predetermined conductor of the first layer, through a predetermined conductor of the second layer, and then back to the first layer to proceed through the remaining conductors of the first and second layers. The circuit then proceeds through predetermined conductors of the third and fourth layers, and then returns to proceed through the remaining conductors of the third and fourth layers. All interconnections are thus short connections between adjacent layers, at both ends of the winding. This makes the axial direction of instantaneous current flow opposite in adjacent layers, but since adjacent layers are wound in opposite circumferential directions, the magnetomotive force produced by the current flowing in each layer is additive.

More specifically, selecting end 30 of the first conductor 24 of layer 12 as the first end of the series circuit, the circuit spirals downwardly through the first layer 12 via every other turn, and proceeds from the second end 32 of the first conductor of layer 12, via conductor 100, to the second end 56 of the second conductor 48 of the next adjacent layer 14. The circuit spirals upwardly through layer 14, appearing at every other turn, and proceeds from the first end 54 of the second conductor 48, via conductor 102, to the first end 34 of the second conductor 26 of layer 12. The circuit again spirals downwardly through layer 12, exiting the second end 36 of conductor 26, and enters the second end 52 of the first conductor 46 of layer 14 via conductor 104. The circuit spirals upwardly through layer 14 for the second time, to complete the first two layers. The circuit then proceeds from end 50 of the first conductor 46 of layer 14 to end 72 of the second conductor 66 of layer 16, via conductor 106, with layers 16 and 18 being interconnected similar to the interconnection of layers 12 and 14. Ends 74 and 90 of the second and first conductors 66 and 84 of layers 16 and 18, respectively, are interconnected via conductor 108, ends 88 and 68 of the first conductors 84 and 64 of layers 18 and 16, respectively, are interconnected via conductor 110, and ends 70 and 94 of the first and second conductors 64 and 86 of layers 16 and 18, respectively, are interconnected via conductor 112. The free ends of the series circuit i.e., ends 92 and 30 of conductors 86 and 24, respectively, of the outermost and innermost layers 18 and 12, as well as the interconnected ends of the conductors in the layers, may now be connected to leads which proceed to the associated tap changer and electrical winding. For example, end 92 of conductor 86 of layer 18 may be connected to a lead 114 which proceeds to terminal TO on the tap changer, or on an associated electrical winding, end 94 of conductor 86 may be connected to lead 116, which is connected to terminal T1, end 88 of conductor 84 may be connected to a conductor 118 which is connected to terminal T2, end 90 of conductor 84 may be connected to a lead 120 and to terminal T3, end 72 of conductor 66 may be connected to a lead 122 and terminal T4, end 52 of conductor 46 may be connected to a lead 124 and terminal T5, end 54 of conductor 48 may be connected to a lead 126 and to terminal T6, end 56 of conductor 48 may be connected to a lead 128 and terminal T7, and end 30 of conductor 24 may be connected to a lead 130 and terminal T8.

Figure 2:
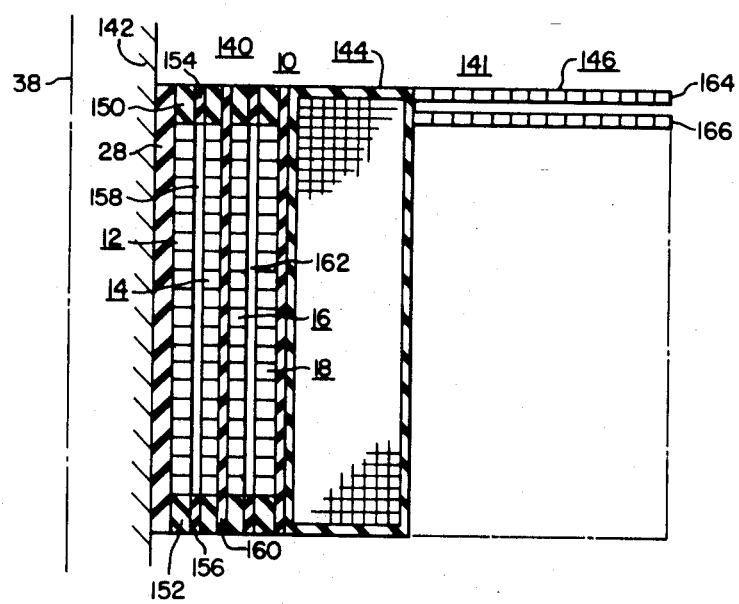
FIG. 2 is a fragmentary elevational view, in section, of a phase of electrical inductive apparatus having a tapped winding constructed according to the teachings of the invention.

FIG. 2 is a fragmentary, elevational view, in section, of a transformer 140 which includes winding 10 shown in FIG. 1 as its tapped or regulating winding. Transformer 140, which may be single or polyphase, includes winding leg member 142 of a suitable magnetic core structure and a winding phase 141 which includes regulating or tapped winding structure 10 disposed about leg 142, a low voltage winding 144 disposed about regulating winding 10, and a high voltage winding 146 disposed about the low voltage winding. Since winding phase 141 is symmetrical about centerline 38, only one half of the phase winding assembly is illustrated in FIG. 2.

Winding assembly 10 is insulated from magnetic core leg 142 by an insulating winding tube member 28, and has insulating collars 150 and 152 disposed at the upper and lower ends, respectively, of the innermost layer 12. Similar insulating collars are disposed above and below the remaining layers. Layer 14 may be spaced from layer 12, as illustrated, by suitable spacer members, such as spacer members 154 and 156, to provide a cooling duct 158 between the layers, for the circulation of cooling fluid. The next two layers 14 and 16 may have solid insulation 160 disposed between them, while layers 16 and 18 may again be spaced to provide a cooling duct 162. The specific arrangement of solid layer insulation and cooling ducts utilized in a specific application will depend upon the specific rating and requirements of the application.

The low voltage winding 144 may be constructed in a conventional manner, as may be the high voltage winding 146. The high voltage winding 146 may be cylindrical or, as shown, it may have a plurality of continuous pancake-type coils, such as coils 164 and 166, with the specific construction depending upon the voltage and power rating of the transformer.

Figure 3:
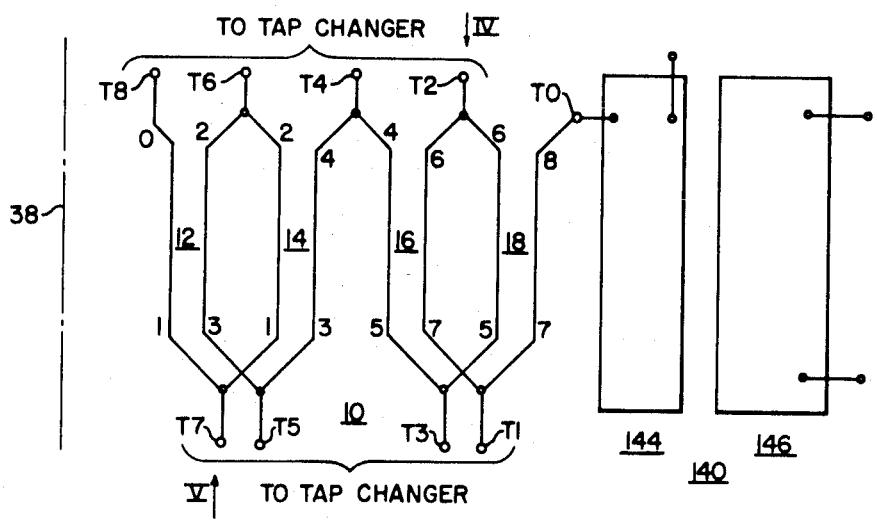
FIG. 3 is a schematic diagram of the electrical inductive apparatus shown in FIG. 2.

As shown schematically in FIG. 3, regulating winding 10 is connected to regulate the voltage across the regulating winding and the low voltage winding of transformer 140, with this structure being isolated and insulated from the high voltage winding 146. However, it is to be understood that transformer 140 may be an autotransformer if desired, and the regulating winding may be connected to regulate the voltage across the tapped winding and the high voltage winding, instead of across the tapped winding and the low voltage winding. If it is assumed that one unit of voltage appears across each conductor of each layer, the schematic diagram of winding 10 shown in FIG. 3 may be used to illustrate that the maximum turn-to-turn voltage in a layer is limited to a maximum of two voltage units, while the maximum layer-to-layer voltage is limited to a maximum of four voltage units.

Figures 4, 5:
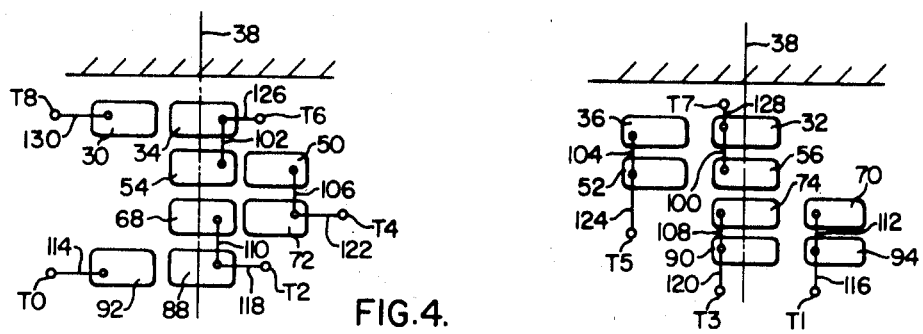
FIG. 4 is a view which illustrates the relative positions and interconnections of the ends of the conductors at the upper axial end of the tapped winding structure shown in FIG. 3, taken in the direction of arrow IV.
FIG. 5 is a view which illustrates the relative positions and interconnections of the ends of the conductors at the lower axial end of the tapped winding structure shown in FIG. 3, taken in the direction of arrow V.

The specific conductors selected for interconnection between adjacent layers, and the specific relative circumferential placement of the ends of the conductors in each of the layers, hereinbefore referred to, is the preferred arrangement, as it facilitates the making of the connections between the ends of the conductors of adjacent layers. This may be more clearly understood by viewing plan views of the lead groups at each axial end of the winding structure, with FIG. 4 illustrating the lead group at the upper or first end of the winding assembly 10, and FIG. 5 illustrating the lead group at the lower or second end of the winding assembly 10. It will be noted that the lead groups are narrow circumferentially, permitting wide copper or aluminum conductors to be utilized for enhancing the mechanical strength of the structure, while aligning lead ends to be interconnected. Thus, the interconnecting leads which interconnect the ends of the conductors of the layers are kept short, simplifying the brazing or soldering required, and facilitating the insulating of the interconnecting and tap leads.

The force produced in an electrical windings has a horizontal component proportional to the mean turn i.e., the average length of a turn in the middle of the radial build, and inversely proportional to the effective height of the winding, and a vertical component inversely proportional to the square of a factor which includes the radial build dimension of the winding. Thus, if a tapped winding structure for an eight section tap changer were to be constructed with eight layers, the winding would have a large radial build, but would not be high or long axially. Thus, the horizontal component of the force would be large due to the longer mean turn and shorter height, while the vertical force would be smaller due to the large radial build dimension. If a two layer tapped winding structure were to be utilized, such as disclosed in the hereinbefore mentioned U.S. Patents, the windings have a small radial build dimension, but are relatively long or tall. Thus, the vertical force component is large while the horizontal component is small. In a tapped winding constructed according to the teachings of the invention, the horizontal and vertical forces are more nearly balanced than in these prior art constructions, providing an inherently stronger structure. Further, the lead groups are narrow circumferentially which enables wider conductors to be utilized, further adding to the mechanical strength of the structure. The narrow, compact lead groups make is possible to construct regulating windings for tap changers having a large plurality of tap sections, such as eight or more, without encountering problems of certain prior art structures, wherein the lead groups are spread out circumferentially, limiting the width of the conductors and making it difficult to bring the leads out past the pressure plates. The disclosed layer construction for the tapped winding is not weakened by pressboard filler strips between turns, required by some prior art arrangements in order to obtain similar overall lengths for different winding layers. Finally, the disclosed winding construction is facilitated by eliminating top to bottom leads, and by aligning the ends of the conductors of the adjacent layers which are interconnected.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. A tapped winding structure having first and second axially opposite ends, comprising: at least first, second, third and fourth concentrically adjacent layers of conductor turns,
   the conductor turns of each of said layers being formed of only first and second axially interleaved conductors, with the turns in each layer being disposed tightly together to increase the mechanical strength of the layer, and with the turns of adjacent layers being oppositely wound,
   the first and second conductors of each of said layers having first and second ends which extend outwardly from the first and second axial ends, respectively, of the winding structure,
   and means interconnecting the ends of predetermined conductors of adjacent layers, at both axial ends of the winding, to connect the conductors of all of said layers in series and direct the series path sequentially through the first, second, first, second, third, fourth, third and fourth layers, said means providing a plurality of terminals adapted for connection to external tap leads.

2. The winding of claim 1 wherein the interconnected ends of the conductors of adjacent layers are in radial alignment with one another.

3. The winding of claim 1 wherein the series path proceeds sequentially through the second conductor of the first layer, the first conductor of the second layer, the first conductor of the first layer, the second conductor of the second layer, the first conductor of the third layer, the second conductor of the fourth layer, the second conductor of the third layer, and the first conductor of the fourth layer.

4. The winding of claim 3 wherein the first layer is the outermost layer.

5. The winding of claim 3 wherein the first layer is the innermost layer.

6. The winding of claim 3 wherein the interconnected ends of the conductors of adjacent layers are in radial alignment with one another.

7. The winding of claim 3 wherein the ends of the first and second conductors of each layer are positioned circumferentially, relative to an axially extending line through the conductor turns of the layer, such that the line passes through the outwardly extending ends of the second and first conductors at the first and second ends, respectively, of the first layer, through the outwardly extending ends of the second conductor at both ends of the second layer, through the outwardly extending ends of the first and second conductors at the first and second ends, respectively, of the third layer, and through the outwardly extending ends of the first conductor at both ends of the fourth layer.

* * * * *